Aug. 4, 1970  E. V. CAVAGNERO  3,522,644
WELDING METHOD FOR BEARING RACES AND OTHER ARTICLES
Filed Feb. 12, 1968  2 Sheets-Sheet 1

*INVENTOR.*
ERMAN V. CAVAGNERO
BY
*McCormick Paulding & Huber*
ATTORNEYS

Aug. 4, 1970     E. V. CAVAGNERO     3,522,644
WELDING METHOD FOR BEARING RACES AND OTHER ARTICLES
Filed Feb. 12, 1968     2 Sheets-Sheet 2

United States Patent Office 3,522,644
Patented Aug. 4, 1970

3,522,644
WELDING METHOD FOR BEARING RACES AND OTHER ARTICLES
Erman V. Cavagnero, Torrington, Conn., assignor to Torin Corporation, a corporation of Connecticut
Continuation-in-part of abandoned application Ser. No. 473,948, July 22, 1965. This application Feb. 12, 1968, Ser. No. 706,217
Int. Cl. B21h 1/12; B23k 31/02, 1/20
U.S. Cl. 29—148.4                    33 Claims

ABSTRACT OF THE DISCLOSURE

A fusion welding method for steel exceeding 0.4% carbon content where all such steel in the article which is integral with the weld surfaces is heated above the upper transformation temperature resulting in a superior weld and a sound article absent localized areas of martensite and other detrimental characteristics. Preheating, simultaneous heating, and/or post heating is employed and when an article is preheated, surfaces to be welded are maintained relatively cold to minimize oxidation. Surfaces to be welded are freshly exposed immediately prior to welding and in an extremely rapid sequence of operations and when preheating is employed; surface exposure, preheating and welding steps are carried out in rapid sequence to minimize oxidation. Surfaces are provided with V-shaped configurations novel to resistance upset butt welding.

CROSS-REFERENCE TO RELATED APPLICATION

The application is a continuation-in-part of my copending U.S. patent application, Ser. No. 473,948 filed July 22, 1965, now abandoned, and entitled, Method for Making Welded Bearing Races and Other Articles.

BACKGROUND OF INVENTION

Bearing races, other closed looped articles, and various other articles of welded construction have not been produced successfully in commercial quality and quantity where substantial strength requirements have been encountered and where the articles have been formed in whole or in substantial part from high carbon steel. Various methods have been employed in welding articles of high carbon steel and such methods have included techniques such as preheating and postheating, but in many instances poorly formed and weak welds have been encountered or localized areas of martensite and "quench cracks" or "hard cracks" have occurred in zones adjacent the welds. Unacceptably low strength characteristics of an article may result from such localized areas of martensite particularly where severe strength requirements must be satified as in the case of bearing races.

SUMMARY OF THE INVENTION

One object of the present invention is to provide a method for making bearing races constructed at least in part from high carbon steel whereby superior fusion welds of substantially "parent strength" can be produced without "quench cracks" or "hard cracks" in zones adjacent the welds, a race having a high degree of structural integrity throughout thus being provided.

A further and more general object of the invention is to provide a fusion welding method as set forth and which has broad application to other closed loop articles as well as other welded articles which may comprise two or more parts in a prewelded condition.

As disclosed hereinbelow, the method of the present invention is employed in the manufacture of a bearing race constructed of "SAE 52100 Steel," the said steel containing one percent (1%) carbon as indicated. It is to be understood, however, that the method of the invention is applicable to a wide variety of welded articles as stated and is in no way limited in application to steel having any specific carbon content or range of carbon contents. It is thought that fusion welding difficulties begin to occur with conventional methods and that the necessity for the present method arises in steels having carbon contents above 0.4% carbon, and it is believed accordingly that the method will find its most widespread use in the welding of steels having carbon contents in this range.

With regard particularly to the phrase "fusion welding" used herein and in the claims which follow, it is to be understood that the term "fusion" is employed in a broad sense to denote coalescence of parent metal. It is intended to include the wide variety of welding techniques both with and without pressure application and/or filler and other materials; while at the same time the term is employed to distinguish over brazing, soldering and similar joining methods. Thus, "fusion welding" and "fusion" are not to be taken in the restrictive definition, sometimes referred to in the welding art, where materials are heated above the melting point and "fusion" is obtained without the application of pressure.

In accordance with the method of the invention, provision is made for two important departures from prior teaching regarding the fusion welding of steel exceeding 0.4% carbon content. As mentioned, prior methods have included preheating and postheating techniques and areas or zones other than the immediate surface or area to be welded have been heated. The present method contemplates heating an article so that the temperature at and adjacent the portions or surfaces to be welded is raised to the required level but it also contemplates heating the article so that the temperature is raised to a high level in the said steel throughout the remaining portion of the article. That is, the entire article, or at least that portion thereof which is constructed of said steel and which is integral with said portions or surfaces, is heated to a high level and there is no area or zone wherein an excessive temperature gradient exists between relatively hot and cold portions of the steel such as might result in a localized area of martensite and in quench cracks or hard cracks. As a result, a superior weld is achieved and areas of structural weakness as might otherwise occur are avoided.

The high level to which the temperature of the aforesaid remaining portion of the article is elevated constitutes a second departure from conventional practice. In the past, preheating and post heating techniques have ordinarily involved the elevation of the temperature of limited portions of workpieces to relatively low levels of temperature well below the transformation temperature of the steel. In accordance with the present method, the temperature of the steel in the remaining portion of the article is raised to a much higher temperature level above the upper transformation temperature of the steel. Further, it is the presently preferred practice to raise the temperature of the steel in the said remaining portion of the article to a level above the upper transformation temperature of the steel and below the maximum forging temperature thereof and, more specifically, to a level within a range extending from the upper transformation temperature to an upper limit 300° F. above the upper transformation temperature. Still further, it is believed that the best results are achieved when the temperature is raised to a level within a range which extends from a lower limit approximately 50° F. above said temperature. As will be seen, optimum results have been obtained with 52100 bearing races in one illustrative example of the method when the temperature has been raised to a level approximately 100° F. above the upper transformation temperature of the said steel.

It is not fully understood why heating of the aforesaid remaining portion of the article to the level mentioned is effective in preventing structural weaknesses, but it is believed that heating to the level stated results in storing of sufficient thermal energy in the article to offset heat losses to tools, etc. such that the temperature at no area or zone in the article prematurely falls through the temperature level at which martensite can form. That is, the temperature at no area or zone falls through such temperature level before the welding and/or post heating is complete and the article can be subjected to such heat treatment as will result in a satisfactorily annealed or hardened article.

The manner in which an article is heated to effect a weld and to heat the steel which is integral with the weld throughout the remaining portion of the article may vary widely. It is contemplated within the method of the invention that various well-known welding techniques may be employed but it is presently the preferred practice to employ resistance upset butt welding of a conventional type wherein electrical current is passed through the article or a portion thereof.

Similarly, various heating sequences are to be regarded as falling within the scope of the invention. Preheating may be employed, as in the examples to be set forth hereinbelow, where the said remaining portion of the article is preheated and the weld is thereafter effected. Alternatively, heating of the article necessary to effect the weld and to raise the temperature of the steel in the remaining portion of the article to the level set forth may be accomplished simultaneously. Still further and within the scope of the invention, the weld may be effected initially and thereafter post heating of the remaining portion of the article may be effected. Thus, the heating step in the method of the present invention may be said to comprise first and second subsidiary steps in the case of preheating or post heating. In the former, the first subsidiary step will of course take the form of preheating and the second will consist in welding. In the latter, the first subsidiary step will take the form of welding and the second post heating. Still further, first, second and third subsidiary steps may be provided for in the form of preheating, welding, and post heating.

Further with regard to the steps in the method of the invention as applied particularly to resistance upset butt welding, it is to be noted that the surfaces to be welded are urged together under substantial pressure throughout at least a portion of the heating step mentioned above. When a bearing race or other closed loop article is to be welded, contiguous end portions thereof may be urged together as in the conventional manner of butt welding. Similarly, "lap," "spot" and other types of welding can be carried out in accordance with the method of the invention by urging the surfaces to be welded into firm engagement during the necessary portion or during all of the heating step.

Further novel aspects of the method include the aforementioned rapid sequence of surface exposure and welding; the rapid sequence of surface exposure, preheating with relatively cold surfaces to be welded, and welding; and the provision of V-shaped surfaces and the use of relatively high welding pressures in the practice of the method in the particular form of resistance upset butt welding.

The drawings show preferred embodiments of the method of the invention and such embodiments will be described, but it will be understood that various changes may be made from the embodiments disclosed, and that the drawings and description are not to be construed as defining or limiting the scope of the invention, the claims forming a part of this specification being relied upon for that purpose. Further, in the claims the particular sequential relationship of the steps as set forth is not to be taken as limiting the scope of the invention.

BRIEF DESCRIPTION OF THE DRAWINGS

FIG. 5 is a schematic illustration showing the bearing race with its end portions held in spaced relationship during a preheating step in the welding method.

DESCRIPTION OF PREFERRED EMBODIMENTS

Example A

Figure 1:
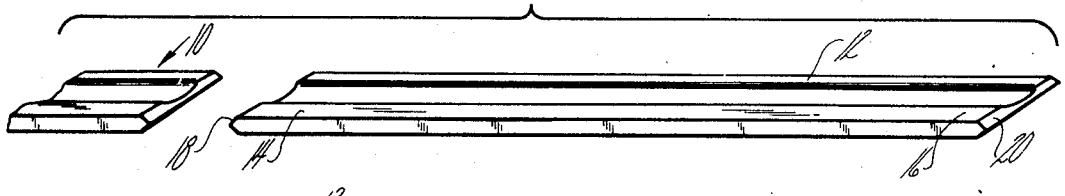
FIG. 1 is a schematic illustration showing a length of strip stock together with a bearing race blank severed therefrom.

Referring now particularly to the drawing, it will be observed that a bearing race is formed therein from strip stock indicated generally at 10. A conventional metal cutting operation provides a blank 12 in flat form for subsequent forming into a bearing race in an open condition. That is, a bearing race is formed with end portions 14, 16 in contiguous relationship for the subsequent welding together of end surfaces 18, 20. As shown, the bearing race is formed in one piece but it will be apparent that formation of the prewelded race in half sections and in other configurations falls within the scope of the present method.

Figure 2:
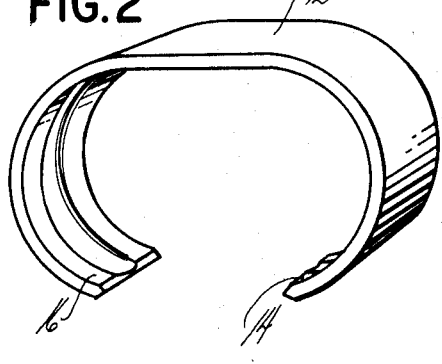
Figure 3:
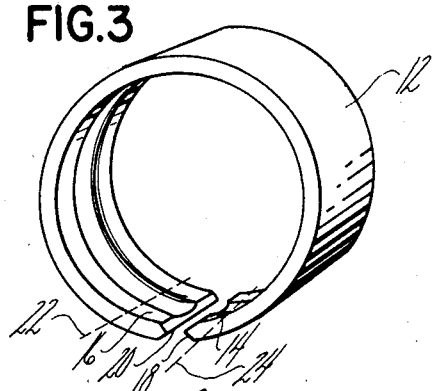
FIG. 3 is a schematic illustration showing the bearing race of FIG. 2 in a more completely formed condition wherein the end portions are closely spaced.

Preferably, and as illustrated in FIGS. 2 and 3, the bearing race 12 is formed in two steps. In FIG. 2, the bearing 12 is partially formed with the end portions 14, 16 in widely spaced relationship. Thus, a scraping or broaching step can be conveniently carried out at the end surfaces 18, 20 and such a step is practiced in accordance with the method of the invention for reasons to be set forth hereinbelow.

Figure 4:
FIG. 4 is an enlarged schematic view showing the configuration of the end portions and end surfaces of the bearing race of FIG. 3.
Figure 5:
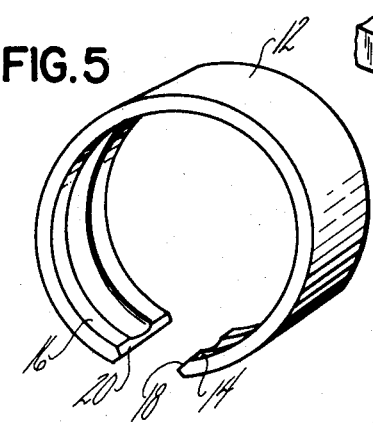
FIG. 5 is a schematic illustration showing the bearing race partially formed from the blank of FIG. 1 with end portions widely spaced.
Figure 6:
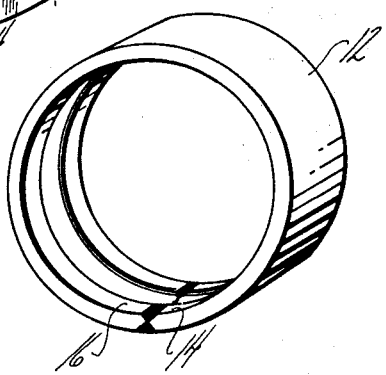
FIG. 6 is a schematic illustration showing the welded bearing race.

Subsequent to the scraping step, and on completion of forming, the bearing race will appear as shown in FIG. 3 preferably with end surfaces 18, 20 formed as shown in FIG. 4. That is, the end surfaces 18 and 20 are preferably formed in the course of a shaping step to a generally V-shaped configuration with the apexes of the V-shaped surfaces disposed toward each other. The shaping step may be carried out at any one of several stages in accordance with the method of the invention. Thus, shaping of the end surfaces 18, 20 may be accomplished prior to the metal cutting step mentioned above, subsequent to said step, or simultaneously therewith.

With the end surfaces 18, 20 shaped as shown, they engage during an initial portion of the welding step whereby the surfaces are welded progressively from a center area outwardly. Zones of entrapped air and the entrapment of various particles deleterious to a good weld are thus avoided. Further, the lateral extension of excessive amounts of material is controlled.

In welding the end portions 14 and 16 together, the heating and welding step of the present method is carried out as described generally above. More specifically, that embodiment of the method which includes the first and second subsidiary heating steps comprising preheating and welding is employed. Further, resistance upset butt welding is employed and preheating of the bearing race is accomplished by passing an electrical current through a portion thereof constituting the aforesaid "remaining portion." The said "remaining portion" of the bearing race may be defined generally as that portion of the race which does not form a part of the end portions 14 and 16. Broken lines, 22, 24 are shown for convenience in defining a line of demarcation between the end portions 14 and 16 and the "remaining portion" of the bearing race.

Further in accord with the method of the invention, preheating of the bearing race is carried out by passing an electrical current through the "remaining portion" of the race from zones of application commencing approximately at the lines 22 and 24 while the end portions 14, 16 of the race are maintained in sufficiently spaced relationship to prevent arcing therebetween and to thus prevent substantial heating thereof. As is well known, oxidation occurs almost instantaneously at high temperatures and has a serious detrimental effect in providing a good weld. Thus, it is advantageous to maintain the end portions 14, 16 in a relatively cold condition and to thereby avoid oxidation at the end surfaces 18 and 20 during the preheating step.

As mentioned above, it is thought that a temperature level approximately 100° above the upper transformation temperature of the steel provides optimum results in accordance with the present method. In the case of the bearing race under discussion in the present example, and which was formed of 52100 steel as stated, the temperature of the "remaining portion" of the race beyond the end portions 14, 16 and the lines 22, 24 was raised in preheating approximately to 1650° F, the upper transformation temperature of the 52100 steel falling approximately at 1550° F. Excellent results were achieved at this temperature level, the finished bearing race showing no evidence of localized regions of martensite, no hard cracks or quench cracks, and a superior degree of structural integrity throughout.

In effecting the weld between the surfaces 18 and 20 after preheating, an electrical current flow was established through the end portions 14 and 16 whereby to raise the temperature as required for welding at the surfaces 18, 20. With the end surfaces 18 and 20 urged together under substantial pressure, the application of an appropriate potential commencing approximately at the lines or zones 22, 24 resulted in current flow through the end portions 14, 16 rather than through the substantially longer path formed by the aforementioned "remaining portion" of the bearing race. Thus, heating was localized at the end portions and welding was accomplished as desired with the entire bearing race raised to a temperature level at least above the upper transformation temperature. In the present example as stated, the entire race was raised at least to 1650° F., the temperature of course being somewhat higher at the weld between the surfaces 18 and 20.

With the entire race at a high temperature, such as 1650° F. and with no severe temperature gradients, the formation of localized areas of martensite at or near the lines or regions 22, 24 was avoided.

In accordance with the present method, cooling of the article after welding may vary widely and may include air cooling, various quenching and other procedures. In the example at hand, the bearing races were quenched immediately after welding and were then tempered for testing with the aforesaid excellent results wherein weld strength substantially equalled the strength of the parent metal. No weak spots were found in testing and bearing races of commercial quality were provided. It is believed that martensite was formed throughout the bearing race and that the resulting desirably homogeneous structure contributed importantly to the good results.

It is also contemplated that a temperature holding step may be conducted subsequent to welding and prior to the cooling step. Such a temperature holding step would serve the purpose of equalizing temperatures throughout the bearing race at a desired level. It is presently believed that the temperature of a bearing race or other article should be held at a level within 100° F. of the upper transformation temperature of the high carbon steel for a period of time just sufficient for the structure to transform substantially throughout to austenite.

Factors of time are significant in the method of the present invention as indicated above. Oxidation at surfaces to be welded of course results in detrimental effects on the completed weld and is to be avoided. While oxidation is somewhat slower at a relatively cold surface, it is nevertheless an important factor for consideration. Thus, the total time which elapses in preparation of surfaces such as 18, 20 is of significance. As will be recalled, surface preparation steps may include a metal cutting operation which creates the surfaces 18 and 20, a scraping operation or step, and a shaping step as indicated in FIG. 4. The entire surface preparation step including all three operations or subsidiary steps should be limited in time. It is believed that a maximum time interval of two minutes between commencement of the surface preparation step and commencement of the welding step should be established. Further, thirty (30) seconds is deemed a more realistic limit. In the example given and, more particularly, in a fully commercial extension thereof, approximately three seconds will be consumed between the commencement of the metal cutting operation which forms the blank 12 and the completion of welding. With such a three-second time interval, it is believed that no problem of oxidation at the end surfaces 18, 20 will be encountered.

As mentioned, the scraping or broaching step takes place prior to the completion of the forming step as illustrated in FIGS. 2 and 3 in the present example of the method. The time lapse between completion of scraping and commencement of the preheating step will approximate one (1) second. Thus, a clean, freshly exposed metallic surface will be presented for welding with little or no opportunity for oxidation or other contamination of the surface.

A very important time factor exists in connection with the interval between preheating and welding in the example set forth above. Oxidation at the end surfaces 18, 20 must be prevented for a good weld and, in addition, cooling of the "remaining portion" by conduction to the relatively cool end portions 14, 16 may result in localized "quenches" and the formation of a localized area or region of martensite if the time interval is too great. Thus, the preheating and welding steps must take place in rapid succession both for the prevention of oxidation at the end surface 18, 20 and for the prevention of quench cracks and hard cracks which may occur at or near regions indicated by the lines 22, 24. It is believed that no more one (1) minute should be permitted to pass in the interval between completion of preheating and the commencement of welding and a limit of thirty (30) seconds is to be desired. In the present example, the bearing race 12 was heated for approximately one-third (⅓) of a second during preheating, an interval of approximately one-sixth (⅙) of a second occurred between preheating and welding, and approximately one-fourth (¼) of a second was consumed in the welding step.

Example B

In a second embodiment of the method of the present invention bearing races are welded in accordance with the illustrative example described hereinbelow.

In this embodiment surface preparation steps are carried out generally as set forth above and preheating is employed but temperature levels may vary from those set out above. Further, a post heating or temperature holding step forms a definite part of the embodiment, the upper transformation temperature of the steel being exceeded in either preheating or post heating or in both preheating and post heating.

Thus, in the illustrative example during preheat the temperature of the aforesaid remaining portions of SAE 52100 bearing races was raised to a level between 1500° F. and 1600° in a period of approximately one-third (⅓) of a second. After an interval of approximately one-sixth (⅙) of a second, a one-sixth (⅙) second welding operation was carried out with temperature at the end portions 14, 16 raised to a level in excess of 2100° F., and doundoubtedly substantially higher at the immediate weld surfaces. The bearings were then transferred in a period of approximately twelve (12) seconds to a furnace for a post heating or temperature holding step. It is believed that bearing temperature dropped to approximately 1400° F. during transfer and that temperature was substantially uniform throughout the races. Post heating was carried out for a period of approximately seventy (70) seconds at a temperature in the range between 1550° F. and 1650° F. An oil quench was employed following post heating and excellent results were achieved with bearing strengths between 80 and 100% of parent metal.

While the upper transformation temperature was probably exceeded above during the 1500° to 1600° F. preheat, it is believed that good results can be obtained by preheating the said remaining portions of races to a level below the upper transformation temperature but above the temperature at which martensite can form, the MS temperature which is approximately 580° F. for SAE 52100. The said remaining portions of the races would then be maintained above such temperature throughout the welding step and to the commencement of post heating thus avoiding localized areas of martensite. Thereafter, during post heat, the entire races would be maintained above the upper transformation temperature for austenite formation throughout and for resulting homogeneous and high-quality races. Precise temperature levels for such relatively low preheat operation have not been determined and will of course vary widely for various steels and for various time intervals between preheat, weld, post heat, etc.

Figure 9:
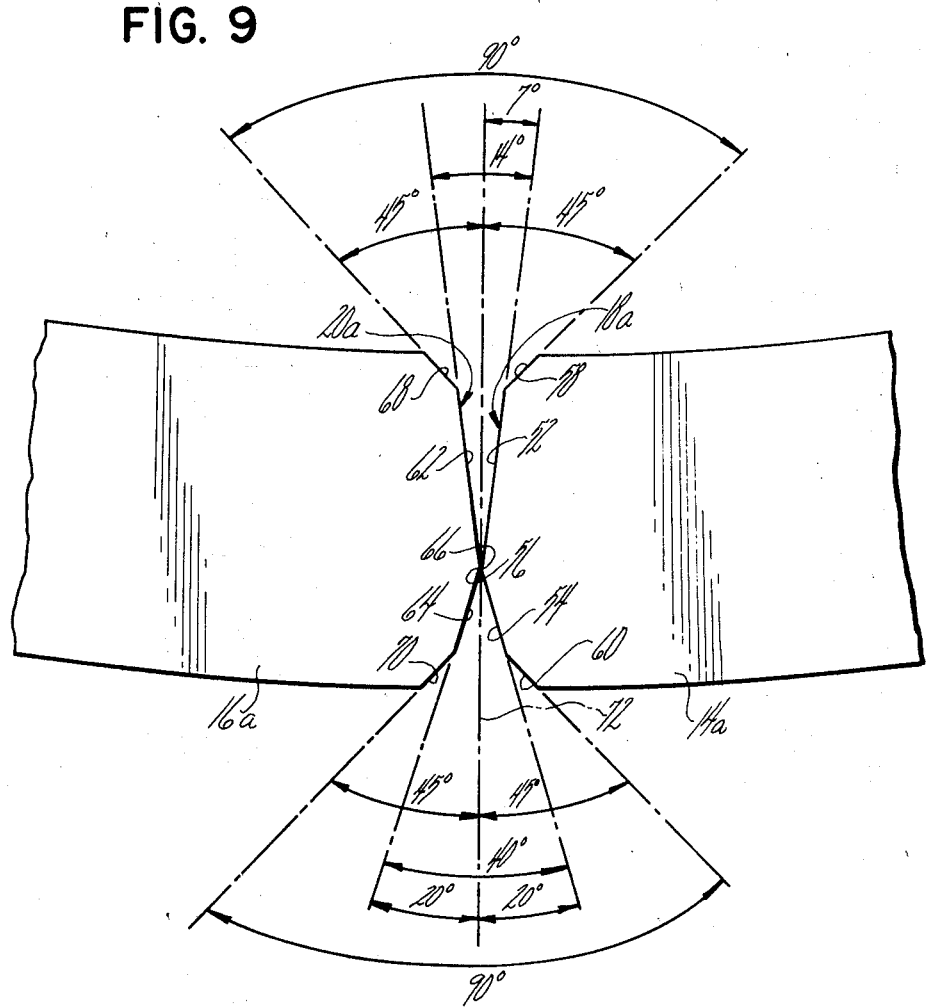
FIG. 9 is an enlarged somewhat schematic view showing the configuration of end surfaces of a bearing race.

Referring particularly to FIG. 9, it will be observed that end portions 14a and 16a representative of races in the present example, vary somewhat from those at 14, 16 in Example A. More specifically, end surfaces 18a, 20a take the form of generally V-shaped projections as do the surfaces 18, 20 but short outermost sections of the surfaces are cut back at angles substantially greater than the major portions of the surfaces. Thus, surface 18a comprises faces 52, 54 extending in opposite directions from apex 56 and short cut-back outermost sections 58, 60. Similarly, the surface 20a has faces 62, 64 extending in opposite directions from apex 66 and short cut-back outermost sections 68, 70. Faces 52, 62, extending from the apexes 56, 66 toward the internal surfaces of the race are each inclined approximately 7° from a normal plane 72 to define an included angle of 14° and the outermost cut-back sections 58, 68 are each inclined approximately 45° from the plane 72 to define an included angle of 90°. Faces 54, 64, extending from the apexes toward the external surface of the race are each inclined approximately 20° from the plane 72 to define an included angle of 40° and the outermost sections 60, 70 are inclined at approximately 45° from plane 72 to define an included angle of 90°. The position of the apexes 56, 66, as shown, is considerably closer to the external surface of the race than the internal surface thereof and is approximately one-third (⅓) of the total distance between said surfaces.

The shaping of end surfaces as described is an important aspect of the method of the present invention as applied particularly to resistance upset butt welding. Thus, in broad form, shaping may comprise the provision of at least one end surface with a generally V-shaped projection which may have a sharp or slightly flattened apex. Preferably, and as shown, each surface is provided with a V-shaped projection and the apexes thereof are engaged under substantial pressure with an electrical current passing through the area of engagement to weld progressively outwardly and to displace impurities progressively outwardly. Included angles between individual faces of the projections may vary, but it is believed that a range of 5° to 50° should be maintained for good results in weld strength, outward displacement of impurities, and control of upset. The illustrated inner and outer included angles of 14° and 40° provide excellent results in this regard and, together with the off center positioning of the apexes 56, 66, such angles provide a particular upset condition which is desired in the present instance, i.e., substantially all of the upset occurs at the inner race surface with little or no upset at the outer surface. The provision of the short cut-back sections 58, 68 and 60, 70 affords design freedom in the selection if desired included angles between the faces 52, 62 and 54, 64 and yet provides for upset control in the creation of additional void space for the reception of upset metal.

As will be apparent from the foregoing, extremely high pressures result at initial stages of welding due to the provision of substantial line contact between the surfaces to be welded. It is believed that welding pressures, calculated on the total cross sectional area of the surfaces to be joined, should be maintained in the range between ten thousand (10,000) pounds per square inch (p.s.i.) and thirty-thousand (30,000) pounds per square inch (p.s.i.) and excellent results have been obtained in the example at hand with a pressure of approximately 15,700 p.s.i. At 15,700 p.s.i., calculated on total cross sectional area, initial pressure with substantial line contact is of course extremely high and in the neighborhood of one million five-hundred thousand (1,500,000) pounds per square inch (p.s.i.).

Figure 10:
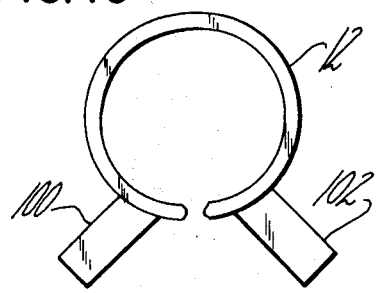
FIG. 10 is a somewhat schematic view showing a bearing race and associated electrodes during preheating.
Figure 11:
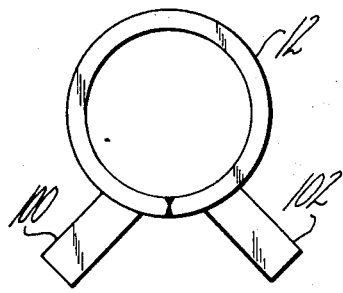
FIG. 11 is a somewhat schematic view showing a bearing race and associated electrodes during welding.

In FIGS. 10 and 11 bearing races are shown schematically in association with electrodes employed in resistance upset butt welding in accordance with the method of the invention. Thus, a bearing race 12 is shown in FIG. 10 with associated electrodes 100, 102 in engagement therewith for a preheating step, the end portions of the race being spaced apart to provide for current flow through a substantial rear or upper portion of the race with the end portions maintained relatively cold. In FIG. 11 the electrodes are again shown in engagement with the race but with the end portions urged together whereby to provide for current flow through the relatively shorter path formed thereby and to accomplish welding together of the said end portions.

As will be apparent, the electrode arrangement described provides for preheating and welding in accordance with the embodiments of the method set out above. Thus, preheating may be accomplished to raise the temperature in the rear or upper portion of the race above the upper transformation temperature or, the temperature in said portion may be raised merely to a level sufficiently high to prevent the formation of martensite and the upper transformation temperature may thereafter be attained during postheating. In either event it is to be noted that areas of the race immediately beneath and in engagement with the electrodes may be at a somewhat lower temperature than said rear or upper portion of the race following preheating, the conduction of heat away from the race by the electrodes of course ocurring at a rapid rate. Such areas may even fail to reach the aforementioned MS temperature of approximately 580° F. during preheat. Provision is made, however, for heating and timing conditions such that no part of the said areas is allowed to first exceed the MS temperature and thereafter fall below said temperature prior to postheat for a sufficient period of time to cause localized martensitic zones. More specifically, the preheating and welding steps are carried out in rapid sequence as set out above and the amount of heat supplied to the race by the electrodes during preheating and welding is so controlled as to store substantial heat in the rear or upper race portion and the end portions thereof. Initially, rapid conduction of heat from the rear or upper portions prevents martensite formation in the said areas prior to welding and thereafter, during and subsequent to welding, heat conduction of course occurs inwardly to each area from each end thereof, to prevent martensite formation until postheating commences.

In order to store sufficient heat for prevention of martensite formation it is desirable to limit the length of the said relatively cold areas and this of course is controlled by electrode configuration. While a precise range of ratios of length of the relatively cold areas to the length of the rear or upper race portion has not been determined, it is believed that a limit of one-fourth (¼) race circumference should not be exceeded in each electrode to race contact area. As shown, each electrode extends over slightly less than one-eighth (⅛) race circumference and excellent results have been achieved with such electrode configuration.

Example C

Figure 7:
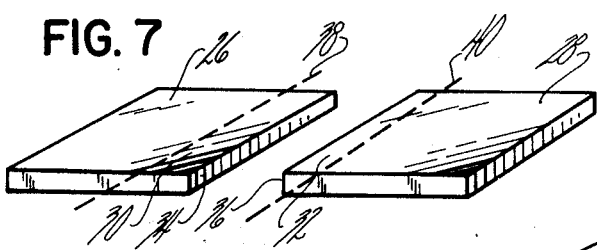
FIG. 7 is a schematic illustration showing first and second flat parts to be "butt" welded.

Referring now particularly to FIG. 7, it will be seen that an article can be readily butt welded in accordance with the present method from two parts 26, 28 having ends portions 30, 32 and end surfaces 34, 36. All of the steps set forth above, with the exception of those which relate particularly to the formation of a closed loop article, can be carried out as described to provide a welded article of steel in excess of 0.4% carbon content having a high degree of structural integrity. If preheating is employed as in the case of Example A and the bearing race 12, end portions 30, 32 defined generally by the lines 38, 40 may be maintained in a relatively cool condition while the outer or remaining portions of the parts 26, 28 are heated as required above the upper transformation temperature of the steel. Thereafter, and in rapid succession following the preheating step, simultaneous welding and heating of the end portions 30, 32 can be accomplished to raise the temperature of the entire article to the aforementioned level.

Example D

Figure 8:
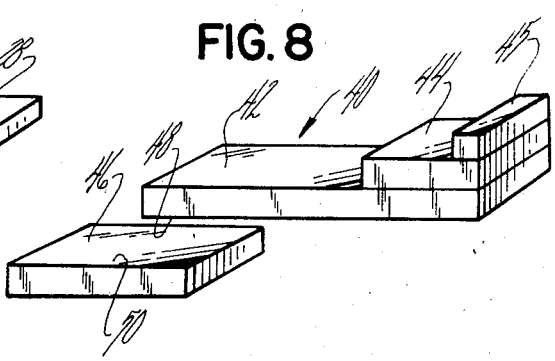
FIG. 8 is a schematic illustration showing a high carbon steel part and a composite part to be "lap" welded.

In FIG. 8 there is shown a composite part 40 having a portion 42 of steel exceeding a 0.4% carbon content, a portion 44 which may be of another material, and a portion 45 which may be of steel exceeding 0.4% carbon content or another material. A second part 46 is also constructed of steel exceeding 0.4% carbon content. The surfaces 48 and 50 can be readily "face" welded in accordance with the method of the present invention and in the exercise of the steps mentioned above. As will be apparent, other than the surfaces or end portions to be welded, is accomplished so as to raise the temperature throughout the steel which is integral with the surfaces to be welded to the level mentioned. As will be apparent, the portion 42 of the part 40 will be heated as required whereas the portions 44 and 45 thereof may or may not be heated, heating thereof being merely incidental to the heating of the said portion 42.

The invention claimed is:

1. A method for making bearing races and other closed loop articles constructed at least in part from steel exceeding 0.4% in carbon content, said method comprising the steps of providing the article in an open condition with end portions in contiguous relationship, heating the article so that the temperature at the end portions is raised to the level required for fusion welding the same together and so that the temperature is raised in the said steel which is integral with said end portions throughout the remaining portion of the article to a level above the upper transformation temperature of the steel, urging said end portions together under pressure during at least part of said heating step to form a closed loop and to weld the end portions together, releasing the pressure between the end portions and cooling the article.

2. A method for making bearing races and other closed loop articles as set forth in claim 1 wherein an electrical current is passed through the article for welding together its said end portions.

3. A method for making bearing races and other closed loop articles as set forth in claim 2 wherein an electrical current is passed through the article for the heating of the said remaining portion of the article.

4. A method for making bearing races and other closed loop articles as set forth in claim 1 wherein said heating step consists in the simultaneous heating for the welding together of said end portions and for the heating of the said steel in said remaining portion of the article.

5. A method for making bearing races and other closed loop articles as set forth in claim 1 wherein said heating step includes the first and second subsidiary steps of initially welding together said end portions and thereafter heating the said steel in said remaining portion of the article to the temperature set forth.

6. A method for making bearing races and other closed loop articles as set forth in claim 1 wherein said heating step includes the first and second subsidiary steps of preheating and welding, said preheating step including heating of the said steel in said remaining portion of the article, and said welding step including subsequent heating at said end portions to weld the same together.

7. A method for making bearing races and other closed loop articles as set forth in claim 6 wherein an electrical current is passed through said article and said end portions thereof are maintained in sufficiently spaced relationship to prevent arcing therebetween and to prevent substantial heating thereof and oxidation thereat during said preheating step, and said end portions are urged together as stated only during said second subsidiary heating step whereby to weld the said portions together.

8. A method for making bearing races and other closed loop articles as set forth in claim 7 wherein said first and second subsidiary heating steps are carried out in rapid succession to prevent oxidation at said end portions, the lapsed time between completion of said preheating step and commencement of said welding step being less than one (1) minute.

9. A method for making bearing races and other closed loop articles as set forth in claim 8 wherein the lapsed time between said first and second subsidiary heating steps is less than 30 seconds.

10. A method for making bearing races and other closed loop articles as set forth in claim 1 wherein the temperature of the said steel in said remaining portion of the article is raised to a level in a range between the upper transformation temperature of the steel and a limit 300° F. above said transformation temperature.

11. A method for making bearing races and other closed loop articles as set forth in claim 10 wherein said range extends from a lower limit approximately 50° F. above said upper transformation temperature to an upper limit approximately 150° F. above said temperature.

12. A method for making bearing races and other closed loop articles as set forth in claim 10 wherein said temperature level is approximately 100° F. above said upper transformation temperature.

13. A method for making bearing races and other closed loop articles as set forth in claim 1 wherein said step of providing an article in open condition includes the subsidiary steps of forming the article and preparing surfaces to be welded at said end portions thereof, said surface preparation step serving to provide clean freshly exposed surfaces for welding and being carried out within two (2) minutes of commencement of welding to prevent substantial oxidation of the surfaces.

14. A method for making bearing races and other closed loop articles as set forth in claim 13 wherein said surface preparation step includes a metal cutting step which is carried out prior to said forming step and which serves to provide a blank from strip stock for use in said forming step.

15. A method for making bearing races and other closed loop articles as set forth in claim 13 wherein said surface preparation step includes a scraping step carried out on said surfaces prior to welding, and wherein said preparation step commences within thirty (30) seconds of commencement of welding.

16. A method for making bearing races and other closed loop articles as set forth in claim 13 wherein said surface preparation step includes a shaping step which provides for generally V-shaped surfaces being disposed toward each other so as to engage during an initial portion of the welding step whereby the surfaces are welded progressively from a central area outwardly.

17. A method for making bearing races and other closed loop articles as set forth in claim 1 wherein said cooling step takes the form of a quench carried out immediately after welding.

18. A method for making bearing races and other closed loop articles as set forth in claim 1 and including a temperature holding step carried out after welding and prior to said cooling step, said temperature holding step including the application of heat to the article to maintain the temperature thereof at a level within 100° F. of the upper transformation temperature of the steel for a period of time sufficient for the structure of the steel to transform substantially throughout to austenite.

19. A method as set forth in claim 1 wherein said steel exceeds .8% carbon content.

20. A method as set forth in claim 1 wherein said steel comprises approximately 1.00% carbon 21. A method as set forth in claim 20 wherein the temperature of the steel in said remaining portion of the article is raised to a level of approximately 50° F. to 150° F. above the upper transformation temperature of said steel.

22. A method for making bearing races and other closed loop articles as set forth in claim 6 wherein said heating step includes a third subsidiary step comprising post heating of the article after welding.

23. A method for making bearing races and other closed loop articles as set forth in claim 22 wherein said preheating step raises the temperature in the said steel in said remaining portion of the article to a level above the upper transformation temperature of the steel.

24. A method for making bearing races and other closed loop articles as set forth in claim 22 wherein said post heating step raises the temperature in the said steel in said remaining portion of the article to a level above the upper transformation temperature of the steel.

25. A method for making bearing races and other closed loop articles as set forth in claim 22 wherein the temperature in the said steel in said remaining portion of the article is raised to a level above the upper transformation temperature of the steel during both preheating and post heating.

26. A method for making bearing races and other closed loop articles as set forth in claim 24 wherein said preheating raises the temperature in the said steel in said remaining portion of the article to a level above the temperature at which martensite can form in the steel, and wherein said remaining portion temperature is maintained above such level through the welding step and until post heating commences.

27. A method for making bearing races and other closed loop articles as set forth in claim 26 wherein said preheating and welding steps are accomplished selectively in rapid sequence and by electrically heating the article in a period of time less than two seconds, said end portions being maintained relatively cold during preheating to minimize oxidation, and wherein said post heating step involves the maintenance of both said end portions and said remaining portion above the upper transformation temperature for a period of time in the range between ten seconds and several minutes.

28. A method for making bearing races and other closed loop articles as set forth in claim 27 wherein said preheating and welding time period is less than one second, and wherein said post heating time period is in the range between 30 and 120 seconds.

29. A method for making bearing races and other closed loop articles as set forth in claim 26 wherein said end portions are provided with freshly exposed surfaces for welding within a five second interval preceding said preheating step.

30. A method for making bearing races and other closed loop articles as set forth in claim 29 wherein said end portions are scraped to provide a freshly exposed surface within a two second interval preceding preheating.

31. A method for making bearing races and other closed loop articles as set forth in claim 27 wherein said end portions are formed to generally V-shaped configuration with apexes disposed toward each other, and wherein said end portions are urged together during welding under a pressure in the range between 10,000 and 30,000 p.s.i. calculated on the total cross sectional area at the joint.

32. A method for making bearing races and other closed loop articles as set forth in claim 27 wherein said article comprises SAE 52100 steel at least in part having an upper transformation temperature of approximately 1500° F., wherein said remaining portion temperature is raised to a level between 1500° F. and 1600° F. during preheating, wherein said end portion temperature is raised to a level substantially higher than 1600° F. during welding, and wherein both said end portions and said remaining portion are maintained at a temperature level between 1550° F. and 1650° F. during post heating.

33. A method for making bearing races and other closed loop articles as set forth in claim 32 wherein said end portion temperature is raised at least to 2100° F. during welding.

References Cited

UNITED STATES PATENTS

| | | | |
|---|---|---|---|
| 2,775,675 | 12/1956 | Foxx | 219—67 X |
| 3,127,674 | 4/1964 | Kohler | 29—498 X |
| 3,229,353 | 1/1966 | Morrison | 29—148.4 |
| 3,262,185 | 7/1966 | Hornigold | 29—148.4 |

THOMAS H. EAGER, Primary Examiner

U.S. Cl. X.R.

29—477, 497.5, 498; 219—67